(12) United States Patent
Lin et al.

(10) Patent No.: US 9,588,811 B2
(45) Date of Patent: Mar. 7, 2017

(54) METHOD AND APPARATUS FOR ANALYSIS OF THREAD LATENCY

(71) Applicant: MEDIATEK INC., Hsin-Chu (TW)

(72) Inventors: Yi-Hsuan Lin, Hsinchu (TW); Hsin-Hsien Huang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/740,232

(22) Filed: Jun. 15, 2015

(65) Prior Publication Data

US 2016/0196164 A1 Jul. 7, 2016

Related U.S. Application Data

(60) Provisional application No. 62/100,083, filed on Jan. 6, 2015.

(51) Int. Cl.
*G06F 9/46* (2006.01)
*G06F 9/48* (2006.01)

(52) U.S. Cl.
CPC ................. *G06F 9/4887* (2013.01)

(58) Field of Classification Search
None
See application file for complete search history.

(56) References Cited

U.S. PATENT DOCUMENTS

| 8,954,968 | B1* | 2/2015 | Pohl | G06F 11/3409 718/100 |
| 2007/0044102 | A1* | 2/2007 | Casotto | G06F 9/4881 718/103 |
| 2008/0147357 | A1* | 6/2008 | Truter | G06F 11/3476 702/186 |
| 2009/0249094 | A1* | 10/2009 | Marshall | G06F 1/3203 713/320 |

\* cited by examiner

*Primary Examiner* — Gregory A Kessler
(74) *Attorney, Agent, or Firm* — Winston Hsu; Scott Margo

(57) ABSTRACT

A method for analysis of thread latency includes: determining a thread of interest; computing a summation of time periods in which the thread of interest stays in a run queue to determine a thread in-run-queue time; computing a summation of time periods in which the thread of interest is preempted by other threads to determine a thread preempted time; and evaluating thread latency of the thread of interest according to the thread preempted time to the thread in-run-queue time.

23 Claims, 4 Drawing Sheets

METHOD AND APPARATUS FOR ANALYSIS OF THREAD LATENCY

CROSS REFERENCE TO RELATED APPLICATIONS

This application claims the benefit of U.S. Provisional Application No. 62/100,083, filed on Jan. 6, 2015. The entire contents of the related applications are incorporated herein by reference.

BACKGROUND

The present invention relates in general to analysis of thread latency. More particularly, the present invention relates to a method, apparatus, and a non-transitory computer readable medium including code that evaluates thread latency caused by preemption of threads and power management policy of hardware regarding the threads.

In computer programming, a thread is a minimum unit of execution of central process unit (CPU) utilization. Programs can be partitioned into multiple threads. Each thread can be executed independently from other threads of a same program. On a multi-processor or multi-core processor machine, several threads of a program can be executed at the same time. Hence, the thread model is a flexible organization mechanism that increases program execution efficiency due to parallel execution of program codes.

As the threads require to access to limited resources on a machine (e.g. CPU, memory, and other hardware), each thread needs to be scheduled by an operating system or kernel of the machine. When a thread is woken up, the thread will be then placed into a run queue. The threads placed into the run queue will wait for access to the resources based on their respective priorities given by the operating system.

However, due to various factors, the threads may be unintentionally starved for access to a particular resource. Thus, the threads may stay in the run queue for a long time, while only gets access to the resources for a relatively short time. This is thread latency, which may cause a bottleneck of performance of the machine because modern computer usually has pipeline architecture. The latency of one thread may disadvantageously affect the execution of another thread. In view of this, there is a need to analyze what factors cause the thread latency in order for better system performance.

SUMMARY

It is therefore one of objectives of the present invention to provide a method for analysis thread latency. The present invention collects statistical data regarding a thread, and accordingly evaluates thread latency according to time periods in which the threads are preempted and/or power management are improper.

According to one embodiment, a method for analysis of thread latency is provided. The method comprises: determining a thread of interest; computing a summation of time periods in which the thread of interest stays in a run queue to determine a thread in-run-queue time; computing a summation of time periods in which the thread of interest is preempted by other threads to determine a thread preempted time; and evaluating thread latency of the thread of interest according to the thread preempted time to the thread in-run-queue time.

According to one embodiment, a non-transitory computer readable medium including code is provided. When the code executed by a computer system performs a method for analysis of thread latency, the method comprising: determining a thread of interest; computing a summation of time periods in which the thread of interest stays in a run queue to determine a thread in-run-queue time; computing a summation of time periods in which the thread of interest is preempted by other threads to determine a thread preempted time; and evaluating thread latency of the thread of interest according to the thread preempted time to the thread in-run-queue time.

According to one embodiment, an apparatus for analysis of thread latency is provided. The apparatus comprises: a computation device and an evaluating device. The computation device is employed for computing a summation of time periods in which the thread of interest stays in a run queue to determine a thread in-run-queue time; and computing a summation of time periods in which the thread of interest is preempted by other threads to determine a thread preempted time. The evaluating device is employed for evaluating thread latency of the thread of interest according to the thread preempted time to the thread in-run-queue time.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

In order for analysis of thread latency, the present invention carries out collection of statistical data regarding a thread from log files generated by the operating system, which includes how long the thread stays in a run queue, and how long the thread is starved for access to a resource (such as the CPU resource). In addition, the present invention further analyzes what reasons dominate the starvation of the resource.

In the beginning, the present invention allows a user to specify a thread of interest. The user may find the poor performance of the system during specific manipulation. For example, the user may find frames dropped during the operating system runs. Thus, the user could specify one of a graphic/display-related threads as the thread of interest. Also, the user could specify a specific period of time as a time period of interest based on when the frames are dropped. Once the user determines the thread of interest and the time period of interest, the present invention starts to carry out the analysis.

Figure 1:
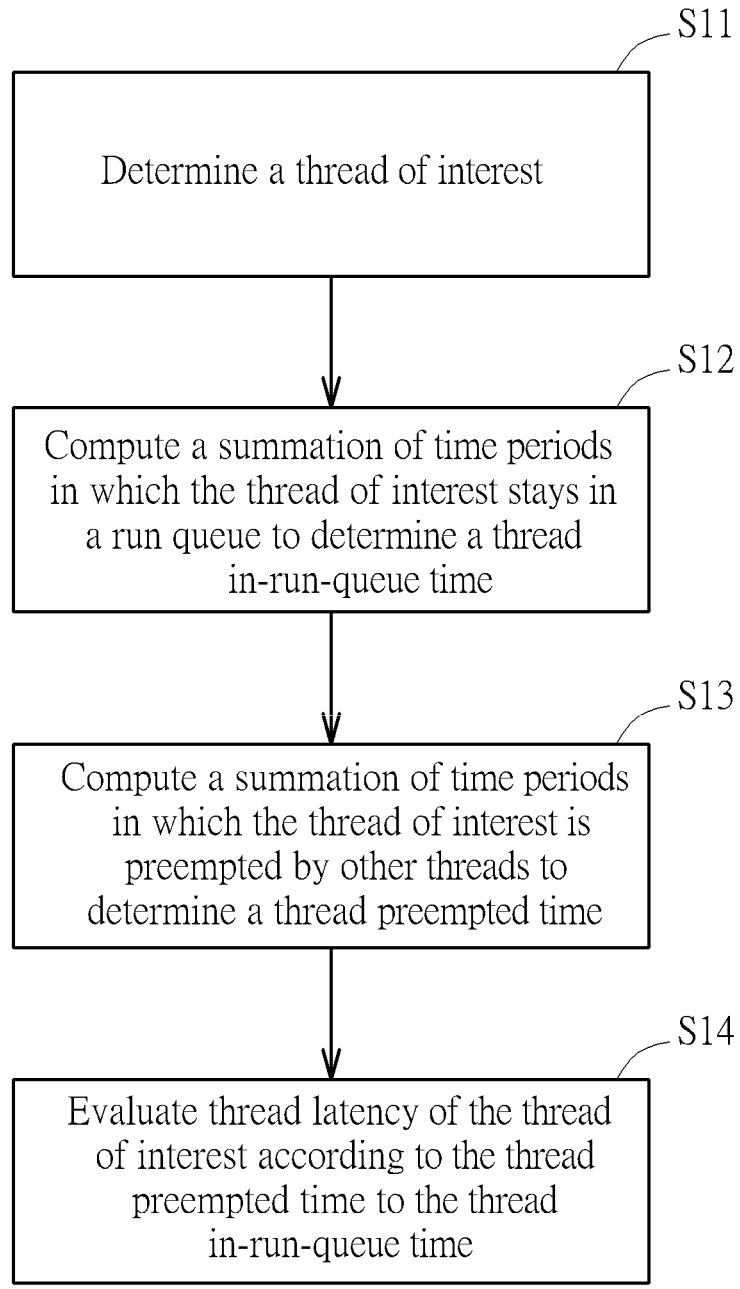
FIG. 1 is a flow chart of a method for analysis of thread latency according to one embodiment of the present invention.

FIG. 1 illustrates a flow chart of a method according to one embodiment of the present invention. After the thread of interest is determined, a thread in-run-queue time will be determined. The thread in-run-queue time means how long a thread stays in a run queue during a time period of interest. A start point of the thread in-run-queue time could be related to a timing of placing the thread of interest into a run queue or waking up the thread of interest, while an end point of thread in-run-queue time could be related to a timing of removing the thread of interest from the run queue or making the thread of interest go to sleep.

Taking a Linux operating system as an example, the present invention may trace events recoded in "wakeup" and "sched_switch" log files corresponding to context switching. In particular, one of timestamps of the following events recorded in the log file could be used as a start point of an in-run-queue period:

sched_wakeup, sched_wakeup new

Such event is related to waking up the thread, and accordingly placing the thread into the run queue. Hence, the timestamps of these events can reflect when the thread starts to be in the run queue.

In addition, one of timestamps of the following events recorded in the log file could be used as an end point of the in-run-queue period:

TASK_INTERRUPTIBLE, TASK_UNINTERRUPTIBLE, TASK_PARKED, _MT_TASK_BLOCKED_RTMUX, MT_TASK_BLOCKED_MUTEX, _MT_TASK_BLOCKED_BLOCLED_IO, TASK_DEAD, EXIT_DEAD, EXIT_ZOMBIE

"TASK_INTERRUPTIBLE" and "TASK_UNINTERRUPTIBLE" usually refers to states that the thread is currently waiting for a response from specific hardware. Hence, this also means the thread goes to sleep while waking the response from the specific hardware, and is removed from the run queue. "_MT_TASK_BLOCKED_RTMUX" and "_MT_TASK_BLOCKED_MUTEX", refers to states that is related to waiting of software locks for accessing to a shared memory, which also means that the thread goes to sleep before gets the software lock. "_MT_TASK_BLOCKED_BLOCLED_IO" refer to the state that the thread is requesting an I/O access operation to I/O related hardware, which means the thread may go to sleep before is allowed to access the I/O related hardware. As the above-mentioned events are related to removing the thread from the run queue or making the thread go to sleep, timestamps of these events are available to serve as the end point of the in-run-queue period.

An in-run-queue period is therefore determined by calculating a time difference between a timestamp of the event used as a start point and a timestamp of the event used as an end point. However, during the time period of interest, the thread may be placed into and removed from the run queue for several times. Hence, the thread in-run-queue time could be derived by summing several in-run-queue periods.

Afterwards, a thread preempted time will be determined. The preemption of the thread is usually the main reason to cause the thread latency. The thread preempted time could be derived by summing preempted periods in which the thread is preempted by other threads from execution. A preempted period starts at a start point which could be a timestamp of the events recoded in the log file that indicates the thread of interest is preempted by which thread, and ends up with an end point which could be a timestamp of the event recoded in the log file that indicates the thread of interest resumes execution from preempted (or a preempting thread gives the resource back to the thread of interest). As the thread of interest may be preempted by different threads for several times during the time period of interest, the thread preempted time could be derived by summing separate preempted periods.

Accordingly, the present invention evaluates the thread latency according to the thread in-run-queue time and the thread preempted time. For example, the present invention may calculate a ratio of the thread preempted time to the thread in-run-queue time. The present invention may also determine whether the ratio is high or low. If the ratio of the thread in-run-queue time to the thread preempted time is high, it represents the thread latency is mainly caused by the preemption. Hence, adjusting the assignment of the priorities of the threads may reduce the possibility that the thread of interest is preempted, thereby to further reduce the thread latency of the thread of interest. In one embodiment, the present invention may further provide statistical charts to the user, such as a pie chart, to visually represent which threads preempts the thread of the interest, and proportion of preempted time period respectively corresponding to each thread preempting the thread of the interest. This can serve a reference for adjusting the assignment of the priorities of threads. However, if the ratio of the thread preempted time to the thread in-run-queue time is low, it means the thread latency may be caused by other factors.

Figure 2:
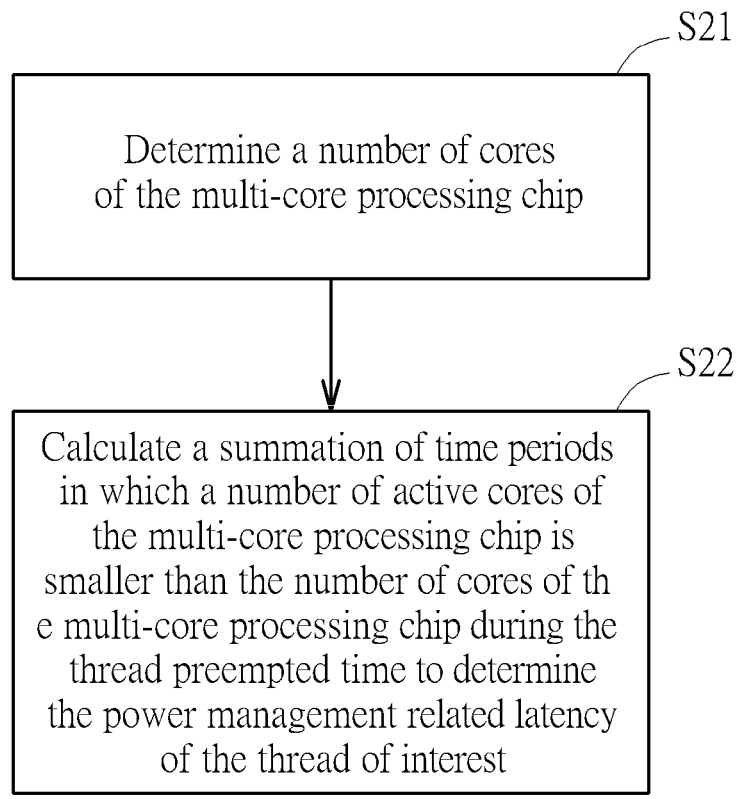
FIG. 2 is a flow chart of determining power management related latency according to one embodiment of the present invention.
Figure 3:
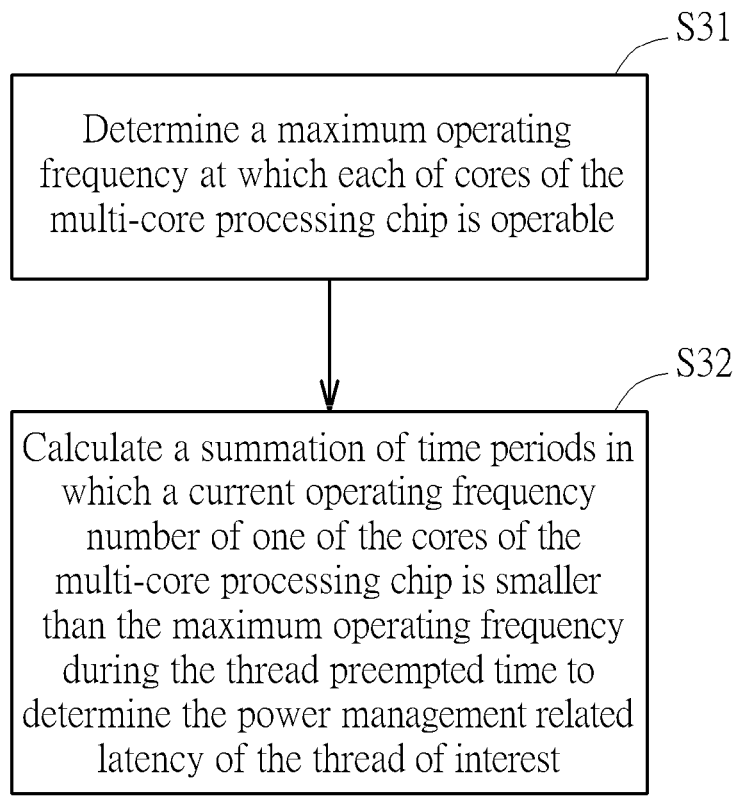
FIG. 3 is a flow chart of determining power management related latency according to another embodiment of the present invention.
Figure 4:
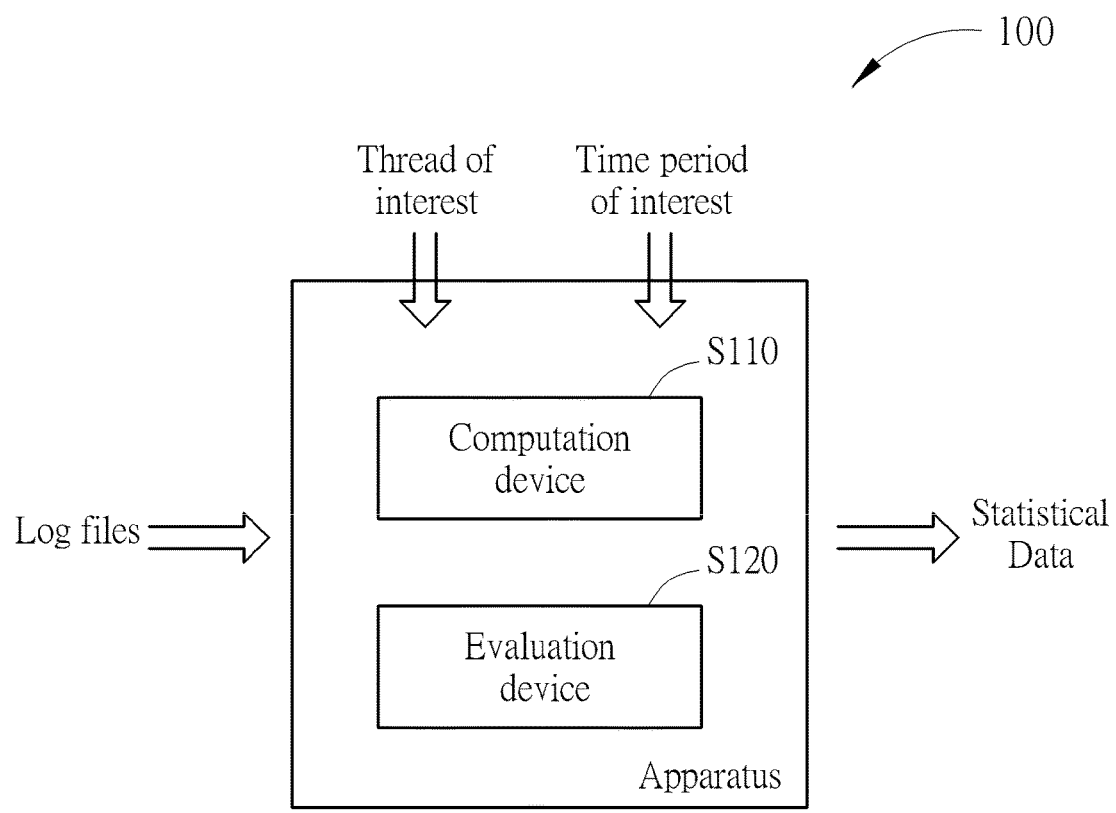
FIG. 4 is a block diagram of an apparatus for analysis of thread latency according to one embodiment of the present invention.

The present invention further analyzes how a power management policy, such as dynamic voltage and frequency scaling (DVFS) or hot-plug policy of the CPU affects the thread latency, and determines how the power management policy of the CPU affects the preempted time. Please refer to FIG. 2, which illustrates a flow chart of determining power management related latency according to one embodiment of the present invention. As shown in FIG. 2, the present invention determines a number of cores of a multi-core processing chip (e.g. CPU) by which the thread is executed. In modern design, the power management policy usually does not allow all of the cores of the multi-core processing chip operate all the time. In most times, one or more of the cores of the multi-core processing chip are shutdown/inactive for power saving. The present invention determines a power management related latency by analyzing how long a number of active cores of the multi-core processing chip is smaller than the number of cores of the multi-core processing chip during the thread preempted time. Time periods in which the number of active cores is smaller than the number of cores of the multi-core processing chip will be summed to determine the power management related latency during the preempted time. In another embodiment shown by FIG. 3, the power management related latency could be also determined by analyzing how long a current operating frequency of each core is smaller than a maximum operating frequency that the core is operable at during the thread preempted time. Time periods in which a current operating frequency of each core is smaller than a maximum operating frequency that the core is operable at to determine the power management related latency during the preempted time.

The present invention may also calculate a ratio of the power management related latency to the thread preempted time and evaluate the thread latency according to the calculated ratio. When a ratio of the power management related latency to the thread preempted time is considerably high, this means the power management policy is too conservative and improper. In other words, if the power management policy allows more cores to be active, or a core to be operated at the maximum operating frequency for longer, the execution of the thread could be finished earlier, and the thread preempted time could be shortened (since more cores or more faster core could execute other threads to reduce the possibility of the preemption). As the power management policy is usually user-programmable, the user may re-program the power management policy once it is found that the ratio of the power management related latency to the thread preempted time is considerably high.

In some embodiments, the present invention further analyzes the power management related latency during the execution of the thread of the interest. This is achievable by determine how long a current operating frequency of each core is smaller than a maximum operating frequency that the core is operable at during the execution of the thread of the interest. Once the execution of the thread of interest has been found slow, this is useful to determine whether the slow execution is caused by the power management policy.

Based on the method mentioned above, the present invention further provides an apparatus for analysis of thread latency. An apparatus 100 includes a computation device 110 and an evaluation device 120. The apparatus 100 carries out analysis based on a thread of interest and a time period of interest specified by a user. Based on log files acquired from an operating system, the computation device 110 is employed for computing a summation of time periods in which a thread of interest stays in a run queue to determine a thread in-run-queue time; and computing a summation of time periods in which the thread of interest is preempted by other threads to determine a thread preempted time such that statistical data regarding the thread of interest can be derived. The evaluating device 120 is then employed for evaluating thread latency of the thread of interest according to the thread preempted time to the thread in-run-queue time. As principles and operations of the present invention has been described in detail before, detailed descriptions regard the apparatus 100 are omitted here for the sake of brevity.

Although in above descriptions it is only mentioned that the present invention analyzes the access to CPU resource, it is not a limitation of the present invention, however. In various embodiments, it is also feasible for the present invention to analyze the access to other limited hardware resources, such as graphic processing units, video codecs, I/O devices, camera devices, or the like.

An embodiment of the invention may include functionality that may be implemented as software executed by a processor, hardware circuits or structures, or a combination of both. The processor may be a general-purpose or dedicated processor. The software may comprise programming logic, instructions or data to implement certain functionality for an embodiment of the invention. The software may be stored in a medium accessible by a machine or a non-transitory computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

In conclusion, the present invention provides a method to analyze the thread latency and the reasons causing the thread latency. Statistical data collected by the present invention and corresponding the analysis result can be further provided to the user for performance optimization. Hence, the present invention provides an approach to improve the thread latency and the tune the system performance more effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for analysis of thread latency, comprising:
   determining a thread of interest;
   computing a summation of time periods in which the thread of interest stays in a run queue to determine a thread in-run-queue time;
   computing a summation of time periods in which the thread of interest is preempted by other threads to determine a thread preempted time;
   determining a ratio of the thread preempted time to the thread in-run-queue time;
   determining that the thread latency is caused by the power management policy if the ratio of the thread preempted time to the thread in-run-queue time is lower than a threshold; and
   generating a system control policy according to the ratio, the thread preempted time and the thread in-run-queue time, wherein system control policy includes at least one of a thread priority assignment policy and a power management policy.

2. The method of claim 1, wherein the step of computing the summation of the time periods in which the thread of interest stays in the run queue to determine the thread in-run-queue time comprises:
   determining a time period in which the thread of interest stays in the run queue, comprising:
      determining a start point according to a timing of waking up the thread of interest or placing the thread of interest into the run queue;
      determining an end point according to a timing of making the thread of interest go to sleep or removing the thread of interest from the run queue; and
      calculating a difference between the start point and the end point to determine the time period.

3. The method of claim 2, wherein the step of determining the start point comprises:
   referring to a timestamp of one of events that are related to waking up the thread of interest is or placing the thread of interest into the run queue recorded in a log file to determine the start point.

4. The method of claim 2, wherein the step of determining the end point comprises:
   referring to a timestamp of one of events that are related to making the thread of interest go to sleep or removing the thread of interest from the run queue recorded in a log file to determine the end point.

5. The method of claim 1, wherein computing the summation of the time periods in which the thread of interest is preempted by the other threads comprises:
   determining a time period in which the thread of interest is preempted by other threads, comprising:
      determining a start point according to a timing at which the thread of interest is preempted from execution;
      determining an end point according to a timing at which the thread of interest resumes execution from preempted; and
      calculating a difference between the start point and the end point to determine the time period in which the thread of interest is preempted.

6. The method of claim 5, wherein the step of determining the start point comprises:
   referring to a timestamp of one of events that are related to the thread of interest being preempted from execution recorded in a log file to determine the start point.

7. The method of claim 5, wherein the step of determining the end point comprises:
   referring to a timestamp of one of events that are related to the thread of interest resuming execution from preempted recorded in a log file to determine the end point.

8. The method of claim 1, further comprising:
   determining power management related latency of the thread of interest according to power management of a multi-core processing chip on which the thread of interest is executed.

9. The method of claim 8, wherein the step of determining the power management related latency of the thread of interest comprises:
   determining a number of cores of the multi-core processing chip; and
   calculating a summation of time periods in which a number of active cores of the multi-core processing chip is smaller than the number of cores of the multi-core processing chip during the thread preempted time to determine the power management related latency of the thread of interest.

10. The method of claim 8, wherein the step of determining the power management related latency of the thread of interest comprises:
   determining a maximum operating frequency at which each of cores of the multi-core processing chip is operable; and
   calculating a summation of time periods in which a current operating frequency of one of the cores of the multi-core processing chip is smaller than the maximum operating frequency during the thread preempted time to determine the power management related latency of the thread of interest.

11. The method of claim 8, wherein the step of determining the power management related latency of the thread of interest comprises:
   determining a maximum operating frequency at which each of cores of the multi-core processing chip is operable;
   calculating a summation of time periods in which a current operating frequency number of one of the cores of the multi-core processing chip is smaller than the maximum operating frequency during execution of the thread of interest to determine the power management related latency of the thread of interest.

12. A non-transitory computer-readable medium including code that when executed by a computer system performs a method for analysis of thread latency, the method comprising:
   determining a thread of interest;
   computing a summation of time periods in which the thread of interest stays in a run queue to determine a thread in-run-queue time;
   computing a summation of time periods in which the thread of interest is preempted by other threads to determine a thread preempted time;
   determining a ratio of the thread preempted time to the thread in-run-queue time;
   determining that the thread latency is caused by the power management policy if the ratio of the thread preempted time to the thread in-run-queue time is lower than a threshold; and
   generating a system control policy according to the ratio, the thread preempted time and the thread in-run-queue time, wherein system control policy includes at least one of a thread priority assignment policy and a power management policy.

13. The non-transitory computer-readable medium of claim 12, wherein the step of computing the summation of the time periods in which the thread of interest stays in the run queue to determine the thread in-run-queue time comprises:
   determining a time period in which the thread of interest stays in the run queue, comprising:
      determining a start point according to a timing of waking up the thread of interest or placing the thread of interest into a run queue;
      determining an end point according to a timing of making the thread of interest go to sleep or removing the thread of interest from the run queue; and
      calculating a difference between the start point and the end point to determine the time period.

14. The non-transitory computer-readable medium of claim 13, wherein the step of determining the start point comprises:
   referring to a timestamp of one of events that are related to waking up the thread of interest is or placing the thread of interest into the run queue recorded in a log file to determine the start point.

15. The non-transitory computer-readable medium of claim 13, wherein the step of determining the end point comprises:
   referring to a timestamp of one of events that are related to making the thread of interest go to sleep or removing the thread of interest from the run queue recorded in a log file to determine the end point.

16. The non-transitory computer-readable medium of claim 12, wherein computing the summation of the time periods in which the thread of interest is preempted by the other threads comprises:
   determining a time period in which the thread of interest is preempted by other threads, comprising:
      determining a start point according to a timing at which the thread of interest is preempted from execution;
      determining an end point according to a timing at which the thread of interest resumes execution from preempted; and
      calculating a difference between the start point and the end point to determine the time period in which the thread of interest is preempted.

17. The non-transitory computer-readable medium of claim 16, wherein the step of determining the start point comprises:
   referring to a timestamp of one of events that are related to the thread of interest being preempted from execution reordered in a log file to determine the start point.

18. The non-transitory computer-readable medium of claim 16, wherein the step of determining the end point comprises:
   referring to a timestamp of one of events that are related to the thread of interest resuming execution from preempted recorded in a log file to determine the end point.

19. The non-transitory computer-readable medium of claim 12, further comprising:
   determining power management related latency of the thread of interest according to power management of a multi-core processing chip on which the thread of interest is executed.

20. The non-transitory computer-readable medium of claim 19, wherein the step of determining the power management related latency of the thread of interest comprises:
   determining a number of cores of the multi-core processing chip; and
   calculating a summation of time periods in which a number of active cores of the multi-core processing chip is smaller than the number of cores of the multi-core processing chip during the thread preempted time to determine the power management related latency of the thread of interest.

21. The non-transitory computer-readable medium of claim 19, wherein the step of determining the power management related latency of the thread of interest comprises:
   determining a maximum operating frequency at which each of cores of the multi-core processing chip is operable; and
   calculating a summation of time periods in which a current operating frequency number of one of the cores of the multi-core processing chip is smaller than the maximum operating frequency during the thread preempted time to determine the power management related latency of the thread of interest.

22. The non-transitory computer-readable medium of claim 19, wherein the step of determining the power management related latency of the thread of interest comprises:
   determining a maximum operating frequency at which each of cores of the multi-core processing chip is operable; and
   calculating a summation of time periods in which a current operating frequency number of one of the cores of the multi-core processing chip is smaller than the maximum operating frequency during execution of the thread of interest to determine the power management related latency of the thread of interest.

23. An apparatus for analysis of thread latency, comprising:
   a computation circuit, for computing a summation of time periods in which a thread of interest stays in a run queue to determine a thread in-run-queue time; computing a summation of time periods in which the thread of interest is preempted by other threads to determine a thread preempted time; and determines a ratio of the thread preempted time to the thread in-run-queue time; and
   an evaluating circuit, for determining that the thread latency is caused by the power management policy if the ratio of the thread preempted time to the thread in-run-queue time is lower than a threshold and generating the system control policy according to the ratio, the thread preempted time and the thread in-run-queue time, wherein system control policy includes at least one of a thread priority assignment policy and a power management policy.

* * * * *